United States Patent [19]

Williams

[11] 4,346,740

[45] Aug. 31, 1982

[54] PIPE ELBOW INSULATOR AND PROTECTIVE JACKET THEREFOR

[76] Inventor: Robert O. Williams, 2264 Weber Rd., Gladwin, Mich. 48624

[21] Appl. No.: 148,529

[22] Filed: May 9, 1980

[51] Int. Cl.³ .................. F16L 59/14; B21D 53/00
[52] U.S. Cl. ................... 138/149; 29/157 A; 285/55
[58] Field of Search ............... 138/110, 149, 178, 155; 285/45, 47, 55, 179; 29/157 A

[56] References Cited

U.S. PATENT DOCUMENTS

| | | | |
|---|---|---|---|
| 99,459 | 2/1870 | Morrison | 285/179 X |
| 743,050 | 11/1903 | Winfield | 29/157 A |
| 2,451,146 | 10/1948 | Baker et al. | 285/47 X |
| 2,761,949 | 9/1956 | Colton | 285/179 X |
| 3,848,308 | 11/1974 | Kaval | 29/157 A |
| 3,870,346 | 3/1975 | Kappelek et al. | 138/149 X |

FOREIGN PATENT DOCUMENTS 1537122  4/1968  France ........................ 138/149

Primary Examiner—James E. Bryant, III
Attorney, Agent, or Firm—Price, Heneveld, Huizenga & Cooper

[57] ABSTRACT

An insulator for pipe elbows and other similar fittings, comprises an insulative insert encasing the pipe elbow, and a protective jacket positioned about the insert. The protective jacket includes a pair of legs having inclined interior ends which are spaced apart in the assembled condition to form a gap therebetween. A jacket collar or gore extends between and completely around the interior leg ends, and is connected therewith to close the gap and form a protective shell which envelopes the insulative insert.

7 Claims, 6 Drawing Figures

PIPE ELBOW INSULATOR AND PROTECTIVE JACKET THEREFOR

BACKGROUND OF THE INVENTION

The present invention relates to insulators for pipes, and in particular to an insulative insert and protective jacket for pipe elbows.

The use of thermal insulating jackets around outdoor pipes, as for various chemical processes, has become an increasingly popular technique used to reduce energy losses. Such insulation typically comprises hollow cylinders or sleeves of insulative material, for example formed glass fibers, expanded synthetic resins, and foams, such as those known in the trade as Cleotemp and Foamglas. The sleeves are typically formed or split into a pair of semicylindrical halves which are positioned over either side of the pipe and fastened in place. A rigid jacket or cover surrounds the insulative insert to protect the same.

Although this type of insulator functions well for straight pipe sections, it is quite difficult to fit the insulator at angled elbow portions of the pipe, and at other similar locations. For example, heretofore, an insulator was fitted at a 90° ell by cutting off the straight insulative sleeve sections perpendicular to the pipe at a location adjacent to the fitting. This leaves a "throat" area between the pipe ends and elbow legs which must be insulated. Specially shaped sections of insulation are cut and individually fitted over the pipe ends and elbow to fill in the throat area. An improved insulator and method for fabricating the same is described in my copending patent application Ser. No. 148,223, filed May 9, 1980, entitled PIPE INSULATOR AND METHOD FOR MAKING SAME, which is hereby incorporated by reference. A two piece, elbow-shaped jacket, known in the trade as a "stove pipe joint", is then positioned over the insulation to protect the same. Such jackets have a central seam, disposed at a 45° angle to the legs of the jacket, with at least two fasteners through the seam to interconnect the jacket halves.

The manual fitting of the insulator about the pipe ends and the elbow is a particularly difficult and time consuming task which requires the services of a highly skilled pipe insulation mechanic. Further, the 45° seam in the protective jacket is not only difficult to form, but is practically impossible to shape in a manner which will mate precisely with the interior edge of the other elbow leg. As a result, the elbow jacket almost always fits poorly, and is not secure.

SUMMARY OF THE INVENTION

In one embodiment of the present invention, a protective jacket is provided for pipe elbow insulators, and comprises first and second jacket legs which have a tubular shape adapted to receive corresponding portions of a pipe insulator therein. The jacket legs each have an inclined interior end oriented toward a medial portion of the jacket, which are spaced apart during an assembled condition, so as to form a gap therebetween. A jacket collar or gore extends between the interior ends of the legs continuously about the periphery of the gap, thereby closing the gap. Fastening means connect the interior ends of the jacket legs with the jacket gore to form a protective shell which envelopes the pipe elbow insulator.

In another embodiment of the present invention, a throatless insulator for pipe elbows is provided, and comprises an insulative insert with first and second insulator legs having an interior channel shaped to respectively receive therein first and second pipe sections. The insulator legs each have a dihedral face adapted for orientation toward each other at a medial portion of the elbow. Each dihedral face includes inner and outer surfaces which intersect at the central axis of the associated leg. The inner surfaces are inclined at an angle substantially equal to one-half of the included angle between the pipe sections, and abut during an assembled condition. The outer surfaces are inclined from the associated inner surfaces at an angle substantially equal to one-quarter of the included angle. A wedge-shaped insulator gore is disposed between the outer surfaces, and includes inclined end faces which mate with the same and form an insulative enclosure about the elbow. A protective jacket having first and second jacket legs and a central jacket gore extends over the insulative insert and forms a protective shell thereabout.

In yet another embodiment of the present invention, a method is provided for fabricating protective jackets for pipe elbow insulators. The method comprises sizing the narrowest and widest portions of the gore in accordance with predetermined dimensions, and cutting the gore side edges along planes which extend therebetween.

The principal objects of the present invention are: to provide an insulator which is easily fabricated and assembled about a pipe or similar fitting; to provide an insulator having a throatless design with an insulative insert and a protective jacket; to provide a protective jacket having a central collar or gore which securely interconnects first and second jackets legs to form a rigid jacket structure; to provide a protective jacket having a split construction to facilitate assembly over previously installed pipe elbows; to provide a protective jacket having an uncomplicated, sturdy design; to provide a protective jacket having a rib and channel arrangement disposed along each side edge of the jacket gore to securely and easily interconnect the jacket legs; to provide a protective jacket which is particularly adapted for use in conjunction with a throatless insulative insert; to provide a quick and efficient method for fabricating a protective jacket; and to provide a protective jacket which is economical to manufacture, efficient in use, capable of a long operating life, and particularly well adapted for the proposed use.

These and many other important advantages of the invention will be further understood and appreciated by those skilled in the art by reference to the following written specification, claims and appended drawings.

DETAILED DESCRIPTION OF THE PREFERRED EMBODIMENTS

Figure 1:
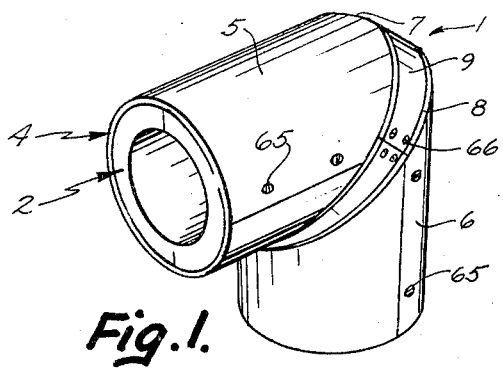
FIG. 1 is a perspective view of a protective jacket embodying the present invention, shown encasing an insulative insert.
Figure 2:
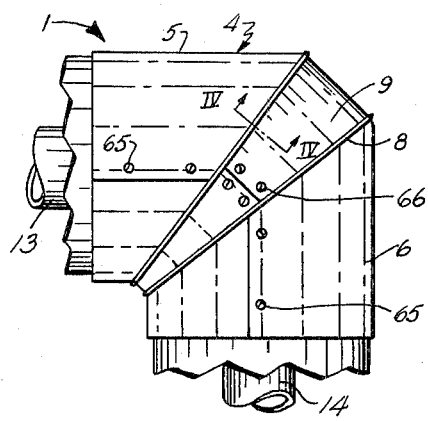
FIG. 2 is a side elevational view of the jacket and insulator assembly.
Figure 3:
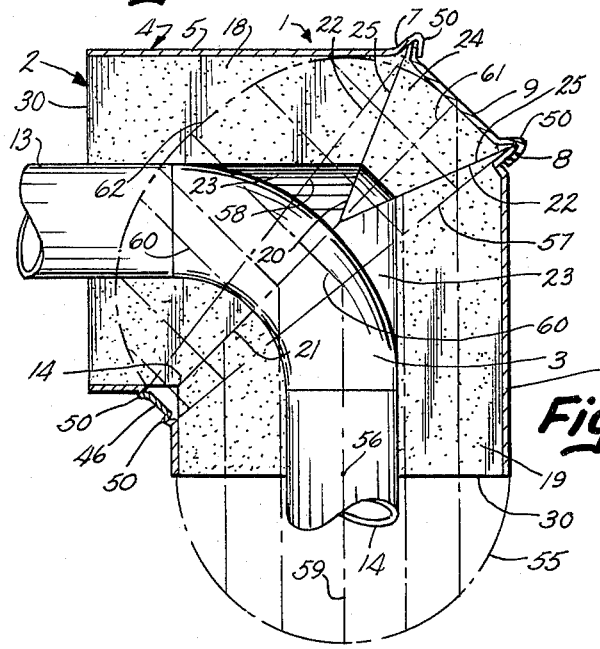
FIG. 3 is a cross-sectional view of the insulator assembly, shown with a section of pipe therein, and with construction lines in phantom illustrating a method for laying out the shape of the jacket parts.

For purposes of description herein, the terms "upper", "lower", "right", "left", "rear", "front", "vertical", "horizontal", and derivatives thereof shall relate to the invention as oriented in FIGS. 1 and 3. However, it is to be understood that the invention may assume various alternative orientations, except where expressly specified to the contrary.

The reference numeral 1 (FIGS. 1 and 3) generally designates an insulator assembly for pipe elbows, and other similar fittings, comprising an insulative insert 2 shaped to cover a pipe elbow 3, and a protective jacket 4 positioned about insert 2. Protective jacket 4 includes a pair of legs 5 and 6 with inclined interior ends 7 and 8 which are spaced apart in the assembled condition to form a gap therebetween. A jacket collar or gore 9 extends between and completely around the interior leg ends 7 and 8, and is connected therewith to close the gap and form a protective shell about insulative insert 2.

Insulator assembly 1 is adapted to insulate a wide variety of pipe elbows, and other similar fittings. In the illustrated example, a threaded, 90° ell is shown interconnecting the ends of straight pipe sections 13 and 14 (FIG. 3). However, it is to be understood that the present invention contemplates an assembly capable of insulating a wide variety of differently shaped fittings, such as elbows having included angles of 120° and 135°, as well as various elbow lengths. The insulator assembly 1 is particularly adapted for insulating elbows having an included angle between the legs of between 90° and 270°.

The present invention is particularly adapted for use on assemblies where the thickness of the insulation is large with respect to the diameter of the pipe which it covers. Pipe elbows are typically curved along an arc which has a known radius and a centerpoint of curvature of gyration. For long radius elbows, the radius is equal to $1\frac{1}{2}$ times the diameter of the pipe. The present insulation assembly is particularly designed for those installations where the centerpoint 14 for the elbow falls within the insulation. Conventional insulating techniques can be used where centerpoint 14 falls outside the insulation. For instance, in a long radius elbow, insulator arrangement 1 works particularly well where the thickness of the insulation is greater than the diameter of the pipe.

The jacket 4 is particularly adapted for use in conjunction with the illustrated insulative insert 2, which is described in detail in my previously identified copending United States patent application. In this example, insert 2 comprises horizontal and vertical insulator legs 18 and 19 (FIG. 3) respectively each having a dihedral face 20 oriented toward each other at a medial portion of elbow 3. Each dihedral face 20 includes inner and outer surfaces 21 and 22 which intersect at the central axis of the associated leg and cavity 23 therein. Inner surfaces 21 are inclined with respect to a plane perpendicular with the central axis of the leg at an angle substantially equal to one-half of the included angle between pipe sections 13 and 14, and abut when assembled. Outer surfaces 22 are inclined from the associated inner surface 21 at an angle substantially equal to one-quarter of the included angle between pipe sections 13 and 14. In other words, the angle between the inner and outer surfaces 21 and 22 on any one leg, as measured on the exterior side thereof, is equal to 180° plus one-quarter of the included angle. In this example, the included angle between pipe sections 13 and 14 is 90°, such that inner surfaces 21 are inclined at a 45° angle, and outer surfaces 22 are inclined at an angle of $22\frac{1}{2}°$ away from inner surface 21. The exterior angle between the inner and outer surfaces is $202\frac{1}{2}°$. A wedge shaped insulator gore 24 is positioned between the outer leg surfaces 22, and includes end faces 25 which are inclined to mate with the leg outer surfaces and form an insulative closure about the elbow 3.

Figure 6:
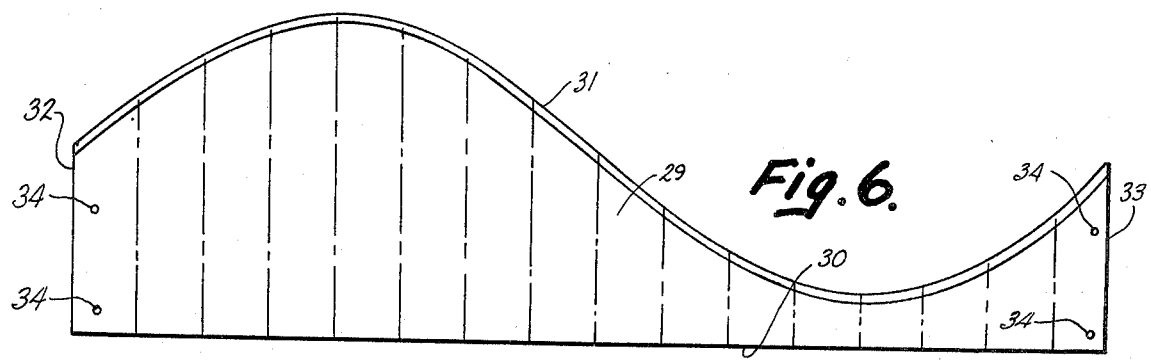
FIG. 6 is a developed view of a jacket leg portion of the protective jacket, with construction lines shown in phantom.

The jacket legs 5 and 6 and jacket gore 9 are each one-piece structures which are preferably constructed from formed panels of sheet material. In the illustrated structure, each of the jacket members is constructed from sheet metal which has been coated with a corrosion resistant material, such as that known in the trade as "Tedlar". As best illustrated in FIG. 6, each jacket leg is fabricated from a shaped panel 29 having a straight base edge 30, which when developed forms the circular free edge of the leg, and an arcuate edge 31, which when developed forms one of the inclined, interior edges 7 and 8 to which center gore 9 is attached. Panel 29 also includes straight end edges 32 and 33, which are positioned mutually parallel, and perpendicular to base edge 30. The end edges 32 and 33 are coextensive in length, and are preferably positioned at a location other than the smallest width of the panel 29, so as to permit fastener apertures 32 to be positioned in a spaced apart manner through the ends. A rib and channel arrangement, as described in detail hereinafter, is disposed along arcuate edge 31 to facilitate connecting the leg with jacket gore 9.

Figure 5:
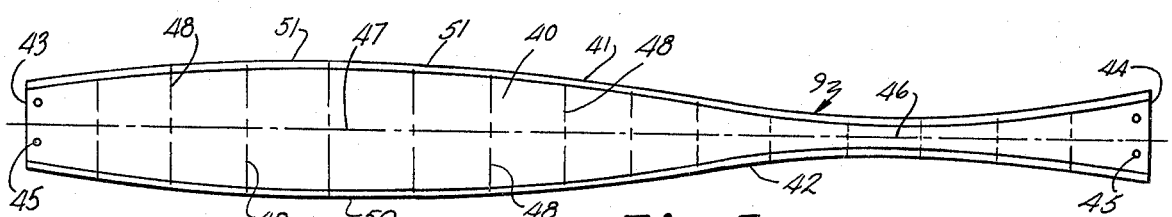
FIG. 5 is a developed view of a center gore portion of the protective jacket, with construction lines shown in phantom.

As best illustrated in FIG. 5, jacket gore 9 is fabricated from a panel 50 having a pair of curvilinear side edges 41 and 42 which are symmetrical about the longitudinal axis of the panel 40. The gore is preferably constructed from the same material used for jacket legs 5 and 6. Panel 40 also includes a pair of linear or straight end edges 43 and 44 which are mutually parallel, and perpendicular to the longitudinal axis of panel 40. Like jacket legs 5 and 6, the location of end edges 43 and 44 is preferably at a point other than the narrowest width of panel 40, to facilitate fastening the free ends of the panel together to form the gore. A pair of spaced apart fastener apertures 45 are disposed along each panel end edge 43 and 44, and mate with each other to receive fasteners therethrough. The end edges 43 and 44 are substantially coextensive in length, and mate when interconnected, such that side edges 41 and 42 curve continuously in an uninterrupted fashion. Preferably, the narrowest portion or throat 46 of the gore panel 40 has a width in the nature of three-quarters to one inch, and the widest portion or heel 47 has a width in the range of three to four inches.

Figure 4:
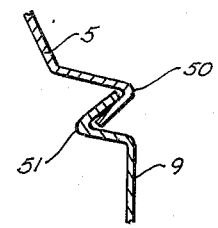
FIG. 4 is an enlarged fragmentary cross-sectional view of the jacket taken along the line IV—IV, FIG. 2.

As best illustrated in FIG. 4, a flange and channel assembly is provided along each interconnecting side edge of the jacket parts, and includes an outer, inverted V-shaped channel 50, and an inner V-shaped channel or flange 51 mating therewith. The channel 50 and flange 51 are preferably rolled in each jacket panel side edge by means such as a beading machine. Channels 50 and 51 are substantially identical in shape, only inverted. In the illustrated example, the center jacket gore has one side edge 41 provided with a flange 51, and the other side edge 42 provided with a channel 50. The interior ends 7 and 8 of the jacket are provided with a corresponding rib and channel to mate with the center gore.

The jacket parts are developed or laid out in a manner illustrated by the construction lines shown in FIG. 3. A semi-circular arc 55 is generated about a point 56 defined by the intersection of the central axis of the vertical pipe and the free end edge 30 of vertical jacket leg 6. The diameter of arc 55 is coextensive with the outside diameter of insert 19 (as well as the diameter of formed jacket leg 6). Arc 55 is then divided into a predetermined number of equal segments, such as the eight portions shown in FIG. 3. The throat portion 46 of center gore 9 is then laid out at a width of between three-quarters of an inch and one inch, and disposed at an angle perpendicular to the inner surfaces 21 of the dihedral faces 20. Lines 57 and 58 are then constructed to interconnect the sides of the gore throat 46 and the outer edges of the outer surfaces 22. The location of the outer edge of surfaces 22 is determined in accordance with the $\frac{1}{2}$-$\frac{1}{4}$ of included angle formulation discussed above. Lines 57 and 58 represent the side edges 41 and 42 of jacket gore 9 after the same has been assembled. A plurality of projection lines 59 are then drawn from the equally spaced points on arc 55 along lines parallel with the central axis of vertical jacket leg 6, to points intersecting the first gore line 57. At the point of intersection, a second set of projection lines 60 are generated from these points of intersection along lines perpendicular to line 61 (the plane of inner surfaces 21) and extending through the second gore line 58. A semi-ellipse 62 is constructed from line 61 by sequentially taking the distance from arc 55 to edge 30 along the projection lines 59, and then measuring this distance off along the corresponding line 60 starting at line 61 to define a locus of points. Construction line 61 forms the major axis of the ellipse. This locus of points, if generated on both sides of construction line 61, forms an ellipse which corresponds to the shape gore 9 assumes when it is assembled with the legs.

The jacket legs 5 and 6 are laid out by first constructing a straight line representing the base edge 30 (FIG. 6) with a length equal to twice the length of arc 55, and dividing the same into equal segments, each segment having a length equal to the linear distance between adjacent points on arc 55. The distance between the base edge 30 and curved edge 31 of the jacket leg is then measured along the projection lines 60 and constructed on the base line 30, thereby deriving the curvature of leg edge 31.

In a similar manner, the central jacket gore 9 is laid out by constructing a longitudinal center line 47 on panel 40. The center line 47 is divided by lines 48 into segments corresponding to those of arc 62, as measured by the distance between adjacent points on arc 62. Lines 48 are not equidistantly spaced. The distance between construction lines 57 and 58 is then measured along the second set of projection lines 60, and these distances are registered on panel 40 on either side of center line 47, at the corresponding division lines 48. The ends of lines 48 form a locus of points defining edges 41 and 42.

After the legs 5 and 6 are cut from a panel of sheet material, they are roll-formed to the proper diameter. A V-shaped channel 50 or flange 51 is then formed along arcuate edge 31 by a beading machine or similar device. For ease of manufacture, the gore 9 is initially formed to a cylindrical configuration having a diameter between that of the major and minor axes of ellipse 62. A V-shaped channel 50 and a flange 51 are placed in opposite side edges of the gore. The gore is sufficiently flexible to permit the installer to deform gore 9 into the elliptical configuration of ellipse 62. This fabrication method allows the user to construct the elbow insulator from the same materials used in the straight pipe insulators.

In use, the insert 2 is first assembled over the pipe elbow 3, and retained thereon by means such as tape, wire, or adhesive, interconnecting the two insert halves. If the throat portion of the insert interferes with the elbow, the protruding portions of the insulative material may be carved away or rounded with a knife to achieve a proper fit. That leg of the jacket 4 with the channel 50 or the female portion of the interlock is then positioned over a corresponding leg of the insulative insert 2. Fasteners 65, such as sheet metal screws, are received in apertures 34 and the end edges of the jacket leg are thereby interconnected. The center gore 9 is then positioned about the interior end of the installed jacket leg in a manner such that the channel and rib configurations mate. Fasteners 66 are then used to interconnect the free ends of the center gore. The jacket leg with the flange 51 or male portion of the interlock is then positioned about the free end of the gore 9, and the ends are interconnected with fasteners 65. In the assembled condition, the center gore 9 is pulled tightly together so as to constrictingly urge against the ribbed jacket leg, and thereby retain the same securely together and form a sturdy jacket assembly. In a similar fashion, the channeled or male interlock leg constrictingly engages the channel 51 of gore 9. The shape of the center gore 9 insures that the channel and rib joints along both side edges thereof mate accurately with the corresponding side edge of the adjacent leg, and may be constructed using available sheet metal fabricating processes.

The three-piece jacket design provides a very sturdy structure, which can be readily manufactured without sophisticated metal forming equipment. Also, the split construction provides quick assembly and a good fit on a wide variety of different elbow configurations.

In the foregoing description, it will be readily appreciated by those skilled in the art that many modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A throatless insulator for pipe elbows, and the like, comprising:
    an insulative insert, including:
        first and second insulator legs, each having an interior channel shaped to respectively receive therein first and second pipe sections interconnected by an elbow;
    said first and second insulator legs each having a dihedral face adapted for orientation toward each other at a medial portion of the elbow; each dihedral face including inner and outer surfaces which intersect at the central axis of said associated leg; said inner surfaces being inclined at an angle substantially equal to one-half of the included angle between said pipe sections, and abutting during an assembled condition; said outer surfaces being inclined from an associated one of the inner surfaces at an angle substantially equal to one-quarter of the included angle;

a wedge-shaped insulator gore disposed between said outer surfaces, with end faces inclined to mate with the same and form an insulative enclosure about the elbow; and a protective jacket, including:

first and second jacket legs having a tubular shape and receiving therein said first and second insulator legs respectively; said jacket legs each having an inclined interior end oriented toward each other at a medial portion of the jacket; said first and second jacket legs being spaced apart during an assembled condition, so as to form a gap between the interior ends thereof;

a jacket gore extending between and completely about the interior ends of said legs, and overlying said insulator gore to close said gap;

means for connecting the interior ends of said jacket legs with said jacket gore to form a protective shell enveloping said insulative insert.

2. A throatless insulator for pipe elbows as set forth in claim 9, wherein:

said insulator legs and insulator gore are split into halves for positioning the same about previously installed pipes;

said jacket legs and said jacket gore are each one-piece structures constructed from formed panels of sheet material, with free ends to facilitate positioning the same about said insulative insert, and include means for fastening said free ends.

3. A method for fabricating a protective jacket for pipe elbow insulators, comprising:

providing an insulative insert having first and second insulator legs with a wedge-shaped insulator gore positioned between inclined outer surfaces of the insulator legs;

forming first and second sleeve-shaped jacket legs from sheet material; said jacket legs having interior ends cut along mutually inclined, predetermined planes, and being spaced apart during an assembled condition to form a gap therebetween;

forming a jacket gore shaped to extend continuously about the periphery of said gap, and close the same; said jacket forming step including:

sizing a narrowest throat portion of said jacket gore between ¾ and 1 inch;

sizing a widest, heel portion of said jacket gore to a width substantially equal to the furthest distance between said insulator leg outer surfaces;

shaping opposing side edges of said jacket gore in a manner such that in the assembled condition said side edges lie along inclined planes which extend respectively from associated sides of said throat and heel portions; said inclined jacket leg planes substantially coextensive with said jacket gore planes; and assembling said jacket legs and gore about said insulative insert to form a protective shall enveloping the same.

4. A method as set forth in claim 3, wherein:

said gore side edge shaping step comprises cutting said side edges in a developed condition from sheet material.

5. A method as set forth in claim 3, including:

forming a rib and channel lock along the adjacent side edges of said jacket legs and gore.

6. A method for fabricating a protective jacket for pipe elbow insulators, comprising:

forming first and second sleeve-shaped jacket legs from sheet material; said jacket legs having interior ends cut along mutually inclined, predetermined planes, and being spaced apart during an assembled condition to form a gap therebetween;

forming a jacket gore from sheet material to extend continuously about the periphery of said gap, and close the same; said jacket forming step including:

sizing a narrowest, throat portion of said jacket gore between ¾ and 1 inch;

sizing a widest, heel portion of said jacket gore to a width substantially equal to the furthest distance between the jacket leg interior ends in the assembled condition;

shaping opposing side edges of said jacket gore by laying out a pair of mutually symmetrical, curvilinear lines on the sheet material in a manner such that in the assembled condition the side edges lie along inclined planes which extend respectively from associated sides of the throat and heel portions, and connecting the interior ends of said jacket legs with the gore side edges to form a protective shell shaped to envelope the pipe elbow insulator.

7. A method as set forth in claim 6, wherein said laying out step includes:

constructing a scaled illustration of the elbow, with a pair of insulator legs and an insulator gore positioned thereabout;

generating a semi-circular arc about a point defined by the intersection of the central axis of one of said insulator legs and the free end edge thereof; said arc having a diameter substantially coextensive with the outside diameter of the one insulator leg;

dividing said arc into a plurality of equal segments;

laying out the throat and heel portions of said jacket symmetrical with a plane bisecting the angle included between the insulator legs;

forming side edge lines which connect the edges of said throat and heel portions;

projecting lines from the ends of the divided arc segments, parallel with the central axis of said one leg to points intersecting the nearest one of the side edge lines;

projecting a second set of lines from said intersecting points, perpendicular with said nearest side edge line, through said other side edge line;

measuring the distance between the side edge lines along each line of said second set, laying the measured distances out symmetrically on a sheet at points spaced apart a distance equal to said arc equal segments, and connecting the associated ends of the distance lines to form the curvilinear side edges of said jacket gore.

* * * * *

UNITED STATES PATENT AND TRADEMARK OFFICE
CERTIFICATE OF CORRECTION

PATENT NO. : 4,346,740
DATED : August 31, 1982
INVENTOR(S) : Robert O. Williams

It is certified that error appears in the above—identified patent and that said Letters Patent is hereby corrected as shown below:

Column 5, line 34:

Before "line", first occurrence, insert -- projection --.

Column 7, line 22:

"9" should be --1--

Column 7, line 61:

"shall" should be --shell--

Signed and Sealed this

First Day of February 1983

[SEAL]

Attest:

GERALD J. MOSSINGHOFF

Attesting Officer     Commissioner of Patents and Trademarks